(12) United States Patent
Hsiao

(10) Patent No.: US 7,880,831 B2
(45) Date of Patent: Feb. 1, 2011

(54) LIQUID CRYSTAL DISPLAY DEVICE AND BACKLIGHT MODULE WITH LIGHT SOURCE FIXING STRUCTURES THAT ARE ELASTICALLY BENT TO CORRESPOND TO A BOWED SHAPE

(75) Inventor: Chih-Chung Hsiao, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 221 days.

(21) Appl. No.: 12/214,936

(22) Filed: Jun. 23, 2008

(65) Prior Publication Data

US 2008/0316391 A1     Dec. 25, 2008

(30) Foreign Application Priority Data

Jun. 22, 2007    (CN) .................... 2007 2 0121063 U

(51) Int. Cl.
*G02F 1/1335*    (2006.01)
*F21V 7/04*    (2006.01)
*G09F 13/04*    (2006.01)
*F21S 4/00*    (2006.01)

(52) U.S. Cl. .................. 349/70; 362/612; 362/97.3; 362/249.02

(58) Field of Classification Search ................... 349/70, 349/71; 362/97.2, 97.3, 249.02–249.04, 362/612
See application file for complete search history.

(56) References Cited

U.S. PATENT DOCUMENTS

| 6,966,674 | B2 | 11/2005 | Tsai | |
| 2007/0002590 | A1* | 1/2007 | Jang et al. | ..................... 362/633 |
| 2008/0186733 | A1* | 8/2008 | Ho et al. | ..................... 362/610 |

* cited by examiner

*Primary Examiner*—Mark A Robinson
*Assistant Examiner*—Paul C Lee
(74) *Attorney, Agent, or Firm*—Wei Te Chung

(57) ABSTRACT

An exemplary backlight module (20) includes a back frame (25) including a bottom plate (251) and light sources (24) each including a base (241). The bottom plate includes fixing structures (254) that are configured for fixing the light sources to the bottom plate such that the bases of the light sources contact the bottom plate. A liquid crystal display device (2) using the backlight module is also provided.

15 Claims, 9 Drawing Sheets

US 7,880,831 B2

LIQUID CRYSTAL DISPLAY DEVICE AND BACKLIGHT MODULE WITH LIGHT SOURCE FIXING STRUCTURES THAT ARE ELASTICALLY BENT TO CORRESPOND TO A BOWED SHAPE

CROSS-REFERENCE TO RELATED APPLICATION

This application is related to, and claims the benefit of, a foreign priority application filed in China as Serial No. 200720121063.8 on Jun. 22, 2007. The related application is incorporated herein by reference.

FIELD OF THE INVENTION

The present invention relates to a backlight module that has a fixing structure and a liquid crystal display (LCD) device implementing the backlight module.

BACKGROUND

LCD devices are commonly used as displays for compact electronic apparatuses, because they provide good quality images with little power consumption and are very thin. The liquid crystal material in an LCD device does not emit light. The liquid crystal material must be lit by a light source to clearly and sharply display text and images. Thus, a backlight module is generally needed for an LCD device.

Referring to FIG. 13, a typical LCD device 1 includes a display panel 19 and a backlight module 10 opposite to the display panel 19. The backlight module 10 is a direct type backlight module, and includes a metal back frame 15, a plurality of light sources 14, a diffuser 11, and a brightness enhancement film (BEF) 12. The plurality of light sources 14, the diffuser 11, and the BEF 12 are accommodated in the metal back frame 15 in that order from bottom to top.

Each light source 14 is a light bar, which includes a base 141 and a plurality of light emitting elements 142 disposed on the base 141. Some circuits (not shown) disposed on the base 141 are used for electrically connecting an external power supply (not shown) to the light emitting elements 142. The external power supply provides power to the light emitting elements 142, enabling the light emitting elements 142 to emit light beams. The light beams emitted from the light emitting elements 142 are provided to the display panel 19 via the diffuser 11 and the BEF 12.

The metal back frame 15 includes a bottom plate 151 and side walls 150 extending perpendicularly from the edges of the bottom plate 151. The bottom plate 151 and the side walls 150 define an accommodating space (not labeled). The plurality of light sources 14, the diffuser 11, and the BEF 12 are received in the accommodating space.

When the backlight module 10 is assembled, the light sources 14 are placed on the bottom plate 151 of the back frame 15 and arranged in an array. Two ends (not labeled) of each light source 14 are affixed to the bottom plate 151 using screws (not labeled). An additional screw (not labeled) can be used to fasten the middle part (not labeled) of the light source 14 to the bottom plate 151.

Thus, the backlight module 10 needs plural screws to affix the light sources 14 to the bottom plate 151 of the back frame 15. The larger the size of the backlight module 10, the more screws that will be needed. Screws make assembling and disassembling the light sources 14 unduly inconvenient and inefficient. Furthermore, the base 141 of the light source 14 needs to be thin for better thermal conductivity. But the base 141 is liable to warp and lose contact with the bottom plate 151 if it is too thin. Thus conduction of heat away from the light source 14 decreases when the base 141 becomes thinner.

Therefore, an improved backlight module is desired to overcome the above-described deficiencies.

SUMMARY

An aspect of the invention relates to a backlight module including a back frame including a bottom plate and a plurality of light sources each including a base. The bottom plate includes a plurality of fixing structures that are configured for fixing the light sources to the bottom plate such that the bases of the light sources contact the bottom plate.

Other novel features and advantages will become more apparent from the following detailed description and when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout the various views.

DETAILED DESCRIPTION OF PREFERRED EMBODIMENTS

Reference will now be made to the drawings to describe preferred embodiments of the present invention in detail.

Figure 1:
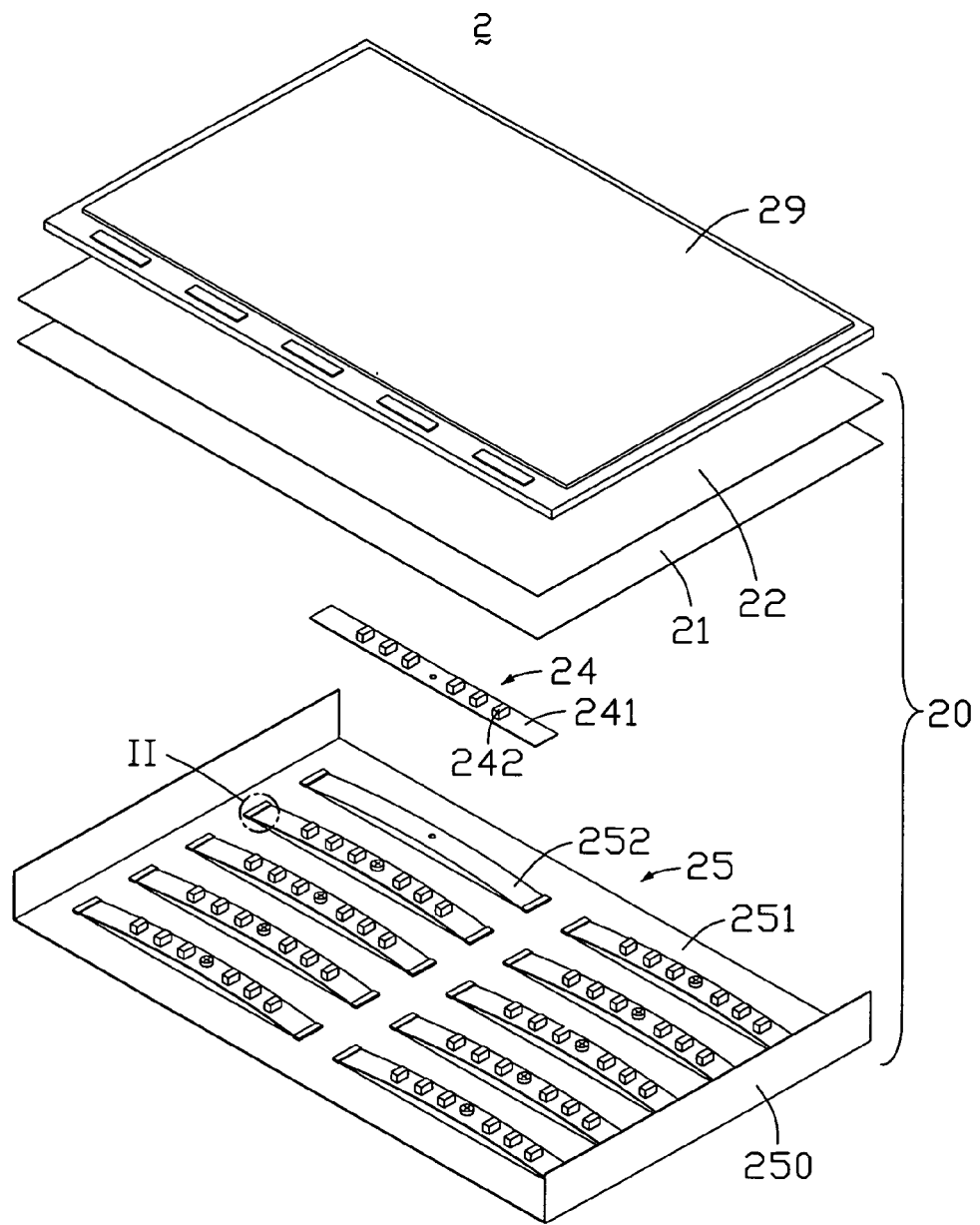
FIG. 1 is an exploded, isometric view of an LCD device according to a first embodiment of the present invention.

Referring to FIG. 1, an LCD device 2 according to a first embodiment of the present invention is shown. The LCD device 2 includes a display panel 29 and a backlight module 20 opposite to the display panel 29. The backlight module 20 is a direct type backlight module, and includes a metal back frame 25, a plurality of light sources 24, a diffuser 21, and a BEF 22. The plurality of light sources 24, the diffuser 21, and the BEF 22 are accommodated in the metal back frame 25 in that order from bottom to top.

Each light source 24 is a light bar, and includes a base 241 and a plurality of light emitting elements 242 disposed on the base 241. Some circuits (not shown) disposed on the base 241 are used for electrically connecting an external power (not shown) to the light emitting elements 242. The external power supply provides power to the light emitting elements 242, enabling the light emitting elements 242 to emit light beams.

The metal back frame 25 includes a bottom plate 251 and side walls 250 extending perpendicularly from the edges of the bottom plate 251. The bottom plate 251 and the side walls 250 define an accommodating space (not labeled). The plurality of light sources 24, the diffuser 21, and the BEF 22 are received in the accommodating space. A plurality of protuberant strips 252 is arranged on the bottom plate 251 in an array. Each protuberant strip 252 has the same shape as the base 241 of the light source 24 and matches to a corresponding light source 24. An upper surface of each protuberant strip 252 is a bandy surface.

Figure 2:
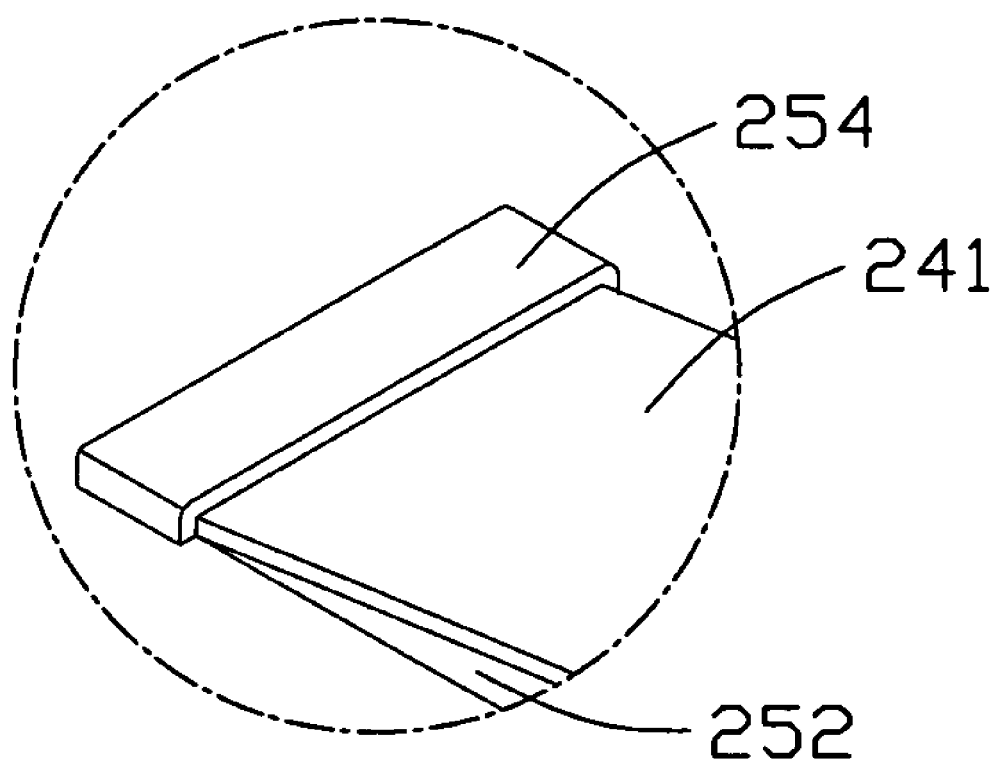
FIG. 2 is an enlarged view of a circled portion II of FIG. 1.

Referring also to FIG. 2, two fixture portions 254 are disposed on the bottom plate 251 and at two ends (not labeled) of each protuberant strip 252. Each fixture portion 254 includes a groove (not labeled) for receiving the corresponding end of the base 241.

The distance between the two fixture portions 254 is slightly less than the length of the base 241 of the light source 24, causing the base 241 to bow slightly and match with the corresponding protuberant strip 252 when the two ends of the base 241 of each light source 24 are inserted into the grooves of the corresponding fixture portions 254. Then the light source 24 becomes fixed on the bottom plate 251 of the metal back frame 25. The light source 24 can be detached from the bottom plate 251 by removing the ends of the base 241 from the grooves of the corresponding fixture portions 254.

In summary, the light sources 24 are fixed on the bottom plate 251 of the metal back frame 25 with the bases 241 held in contact with the bandy surfaces of the protuberant strips 252 by inserting the ends of the bases 241 into the grooves of the fixture portions 254. Assembling the light sources 24 does not require external fasteners such as screws, making assembling and disassembling the light sources 24 convenient and efficient. Furthermore, the base 241 is forced into contact with the bandy cambered surface of the corresponding protuberant strip 252, increasing thermal conductivity and making it difficult for the base 241 to warp.

In an alternative embodiment, the plurality of light sources 24 disposed on the bottom plate 251 is not limited to an array having two columns according to the above-described embodiment. For example, the number of the columns of the array can vary according to needs. Furthermore, a screw (not labeled) can be added to affix the middle part of each light source 24 for added security.

Figure 3:
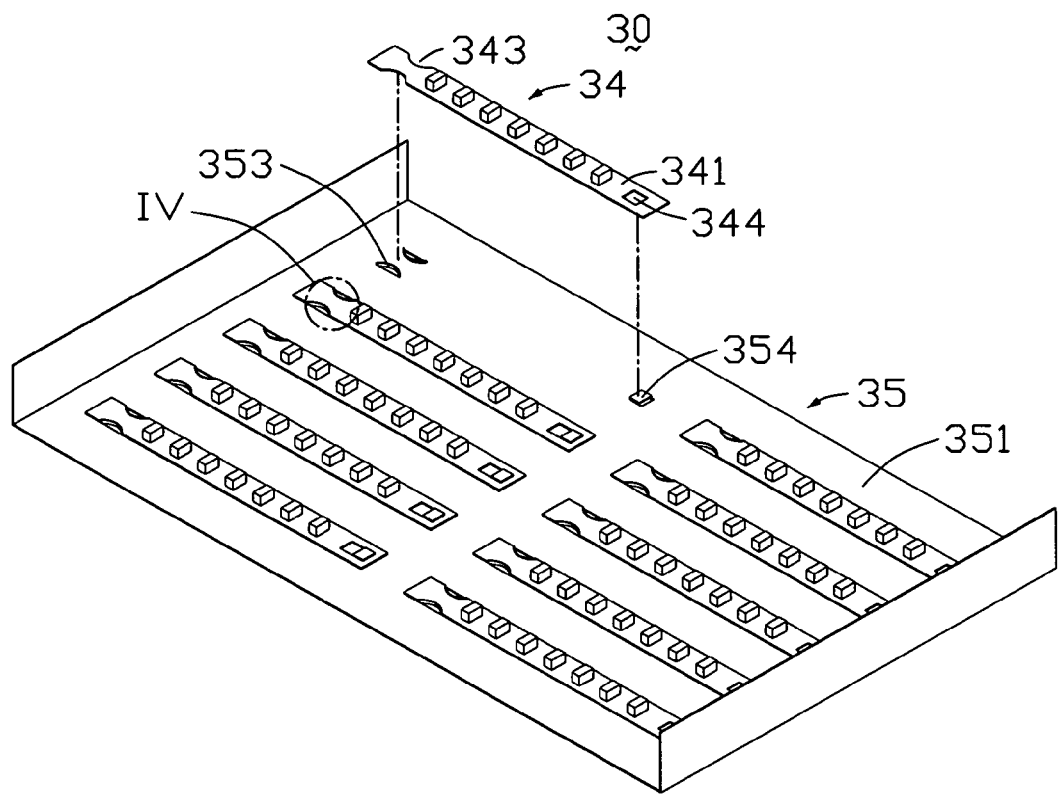
FIG. 3 is an exploded, isometric view of a backlight module of an LCD device according to a second embodiment of the present invention.
Figure 4:
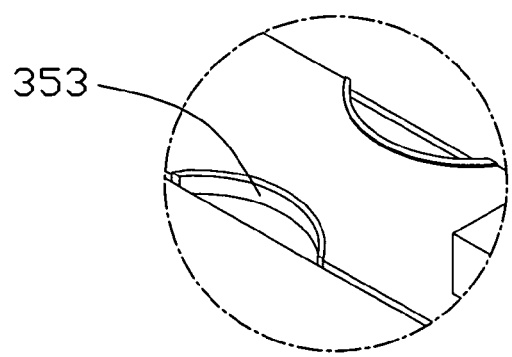
FIG. 4 is an enlarged view of a circled portion IV of FIG. 3.

Referring now to FIG. 3 and FIG. 4, aspects of a backlight module 30 according to a second embodiment of the present invention are shown. Two first openings 343 are disposed near an end (not labeled) of a base 341 of each light source 34 at two opposite longer edges (not labeled) of the base 341. The two first openings 343 each have the shape of a circular arc. A second opening 344 with a rectangular (e.g., square) shape is disposed near an opposite end (not labeled) of the base 341. A metal back frame 35 includes a bottom plate 351 and two opposite side flanges (not labeled). For each light source 34, two first fixture blocks 353 corresponding to the two first openings 343 are disposed on the bottom plate 351. A second fixture block 354 corresponding to the second opening 344 is also disposed on the bottom plate 351. The second fixture block 354 has a substantially L-shaped cross-section, and can be formed by punching the bottom plate 351. The second fixture block 354 includes a supporting portion (not labeled) and a buckling portion (not labeled). The supporting portion is connected to the bottom plate 351, and an extending direction of the buckling portion is in a direction away from the first fixture blocks 353. In the illustrated embodiment, an angle between the supporting portion and the buckling portion is less than 90°.

The backlight module 30 is assembled by attaching the light sources 34 one by one. Each light source 34 is maneuvered so that the corresponding second fixture block 354 is received through the second opening 344. Then the base 341 slid toward the first fixture blocks 353 and is affixed to the bottom plate 351 by buckling the neck between the first openings 343 and the first fixture blocks 353. Thus the base 341 fully abuts the bottom plate 351 and can contact the bottom plate 351 along a length thereof.

Figure 5:
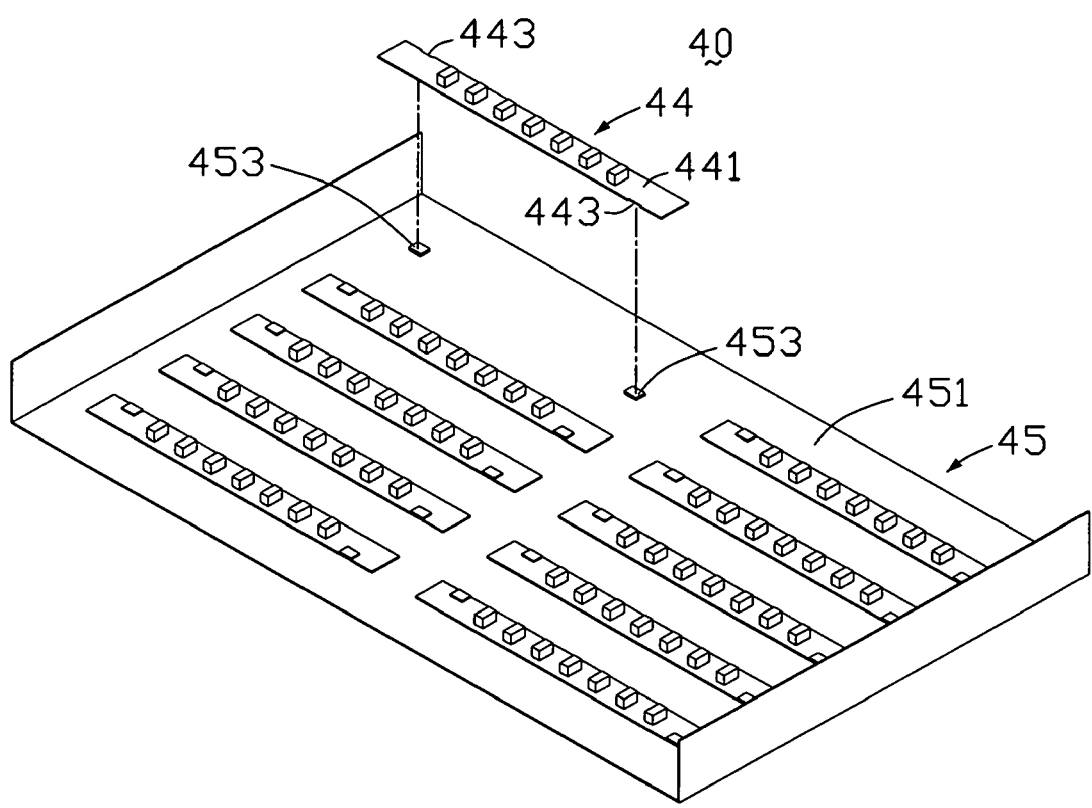
FIG. 5 is an exploded, isometric view of a backlight module of an LCD device according to a third embodiment of the present invention.

Referring to FIG. 5 this shows a backlight module 40 according to a third embodiment of the present invention. The backlight module 40 is similar to the backlight module 30 in FIG. 3. However, two openings 443 are disposed near opposite ends (not labeled) of a base 441 of each light source 44 at two opposite longer edges (not labeled) of the base 441. Two fixture blocks 453 corresponding to the two openings 443 are disposed on a bottom plate 451 of a metal back frame 45. The fixture blocks 453 each have a substantially L-shaped cross-section, and can be formed by punching the bottom plate 451. The two fixture blocks 453 each include a supporting portion (not labeled) and a buckling portion (not labeled). The supporting portions are connected to the bottom plate 451, and extending directions of the buckling portions are in opposite directions. In the illustrated embodiment, the angle between the supporting portion and the buckling portion of each fixture block 453 is less than 90°.

The backlight module 40 is assembled by attaching the light sources 44 one by one. The base 441 of each light source 44 is placed on the bottom plate 451 with the two openings 443 facing the two corresponding fixture blocks 453. Next, the base 441 is rotated until the ends of the base 441 at the openings 443 buckle to the fixture blocks 453 of the bottom plate 451.

Figure 6:
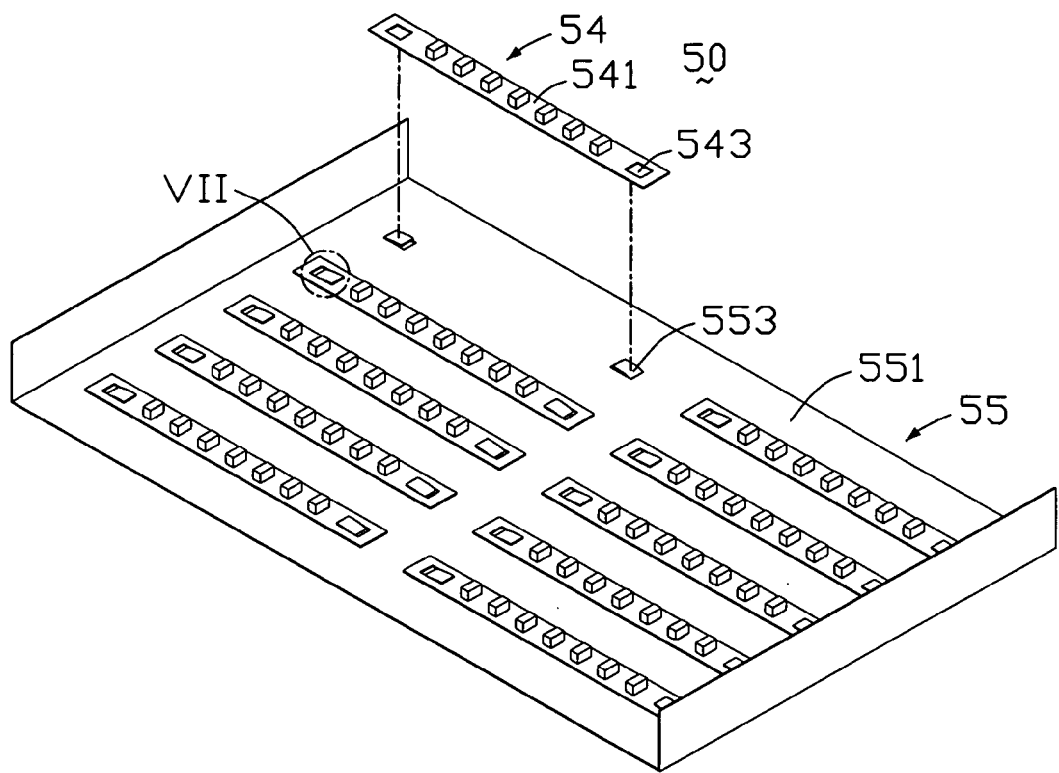
FIG. 6 is an exploded, isometric view of a backlight module of an LCD device according to a fourth embodiment of the present invention.
Figure 7:
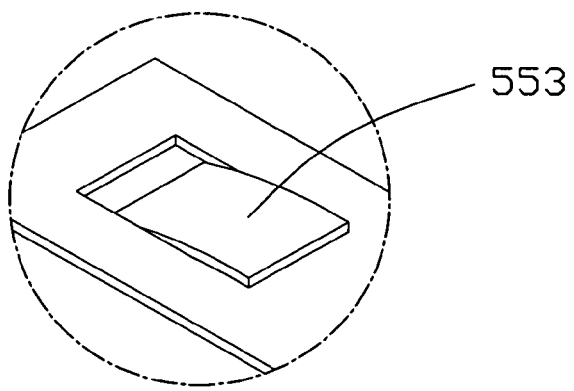
FIG. 7 is an enlarged view of a circled portion VII of FIG. 6.

Referring to FIG. 6 and FIG. 7 aspects of a backlight module 50 according to a fourth embodiment of the present invention are shown. The backlight module 50 is similar to the backlight module 40 in FIG. 5. However, two openings 543 are disposed near two ends (not labeled) of a base 541 of each light source 54. The two openings 543 each have a rectangular (e.g., square) shape. Two fixture blocks 553 corresponding to the two openings 543 are disposed on a bottom plate 551 of a metal back frame 55. The fixture blocks 553 can be formed by punching the bottom plate 551 and creating angles with the bottom plate 551. The extending directions of the two fixture blocks 553 are toward each other. In the illustrated embodiment, the fixture blocks 553 are gently curved or arced. The angle between each fixture block 553 and the bottom plate 551 is less than 90°.

The backlight module 50 is assembled by attaching the light sources 54 one by one. The base 541 of each light source 54 is slightly bent until the corresponding fixture blocks 553 of the bottom plate 551 are inserted into the openings 543 and buckle the base 541 at the openings 543 when the base 541 rebounds. Thus the base 541 abuts the bottom plate 551, and the light source 54 is fixed to the bottom plate 551.

Figure 8:
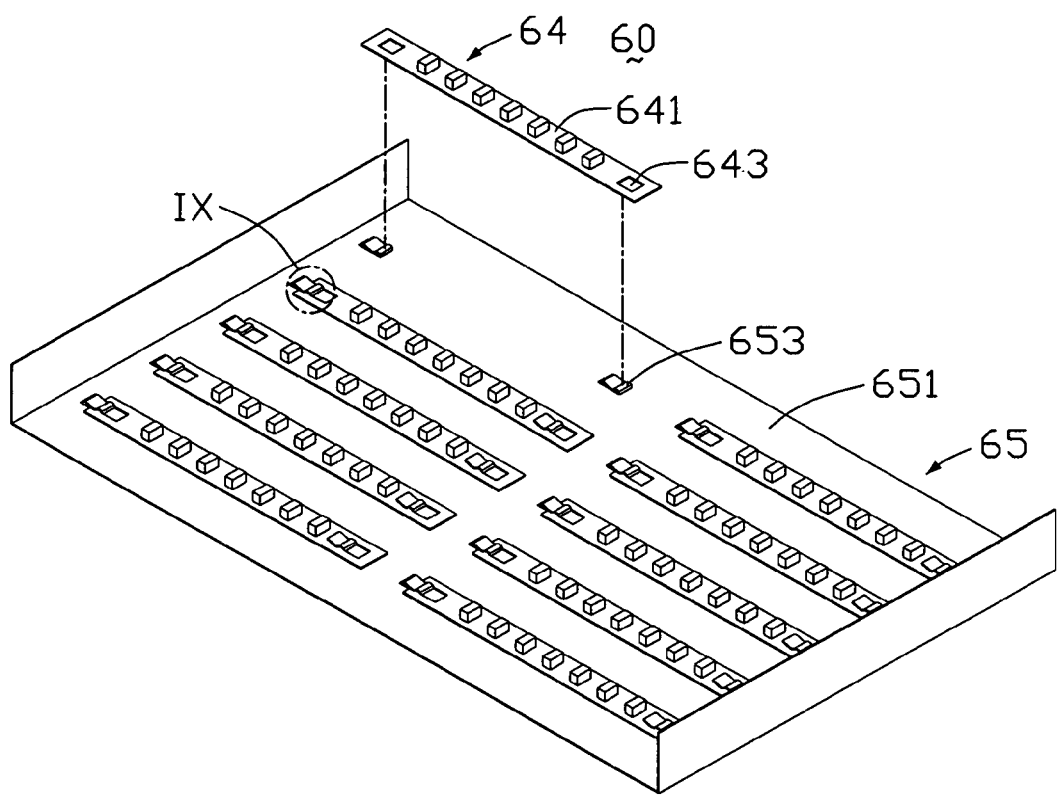
FIG. 8 is an exploded, isometric view of a backlight module of an LCD device according to a fifth embodiment of the present invention.
Figure 9:
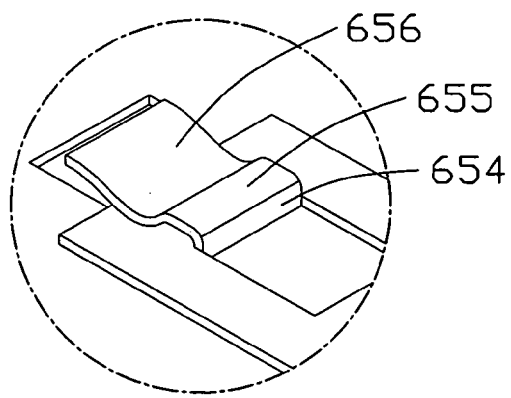
FIG. 9 is an enlarged view of a circled portion IX of FIG. 8.

Referring to FIG. 8 and FIG. 9, aspects of a backlight module 60 according to a fifth embodiment of the present invention are shown. The backlight module 60 is similar to the backlight module 50 in FIG. 6. However, fixture blocks 653 are disposed on a bottom plate 651 of a metal back frame 65. Each fixture block 653 includes a supporting portion 654, a connection portion 655, and a buckling portion 656 that are connected. The supporting portion 654 is connected to the bottom plate 651. The buckling portion 656 includes a downwardly curved part (not labeled). Typically, the buckling portion 656 is resiliently deformable. The fixture blocks 653 are arranged in pairs, with the fixture blocks 653 in each pair pointing in the same direction. The two fixture blocks 653 correspond to two openings 643 of a base 641 of a respective light source 64.

The backlight module 60 is assembled by attaching the light sources 64 one by one. Each pair of fixture blocks 653 are inserted into the two openings 643 of the base 641 of the corresponding light source 64. Then the base 641 is moved along the opposite direction to the pointing direction of the fixture blocks 653 until the buckling portions 656 press against the base 641. Thus, the base 641 abuts the bottom plate 651, and the light source 64 is fixed to the bottom plate 651.

Figure 10:
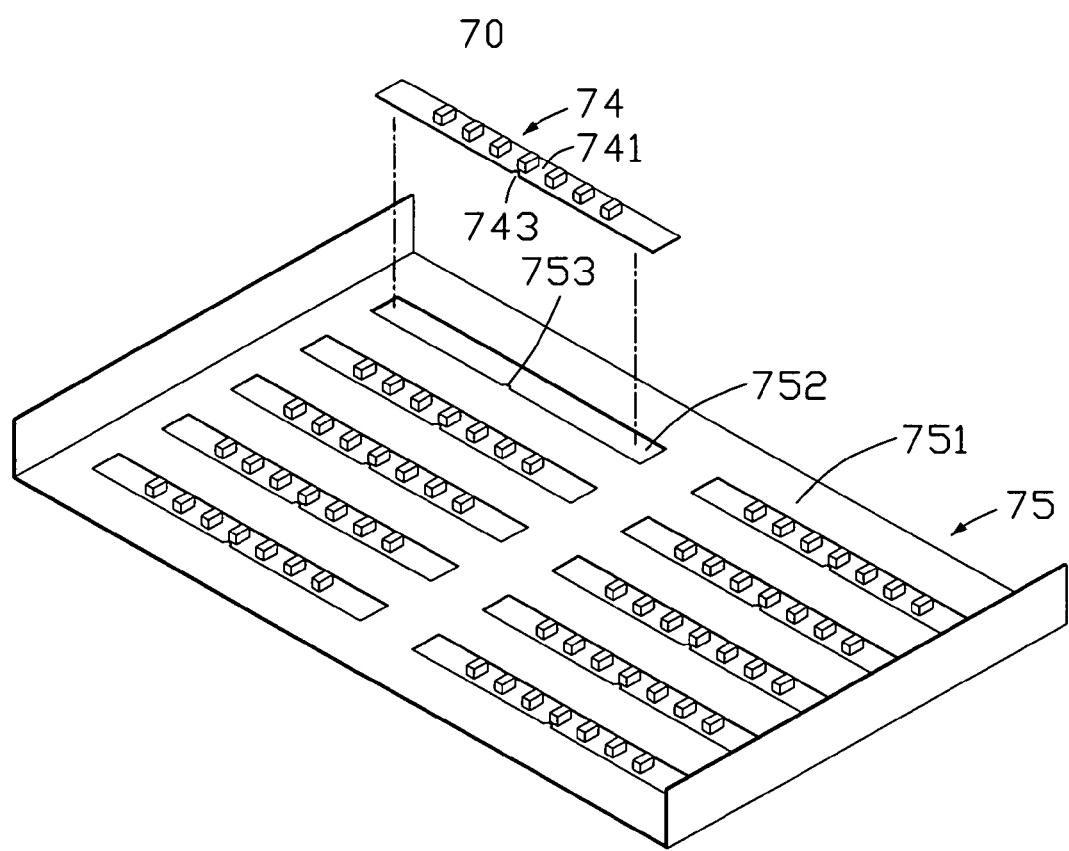
FIG. 10 is an exploded, isometric view of a backlight module of an LCD device according to a sixth embodiment of the present invention.
Figure 11:
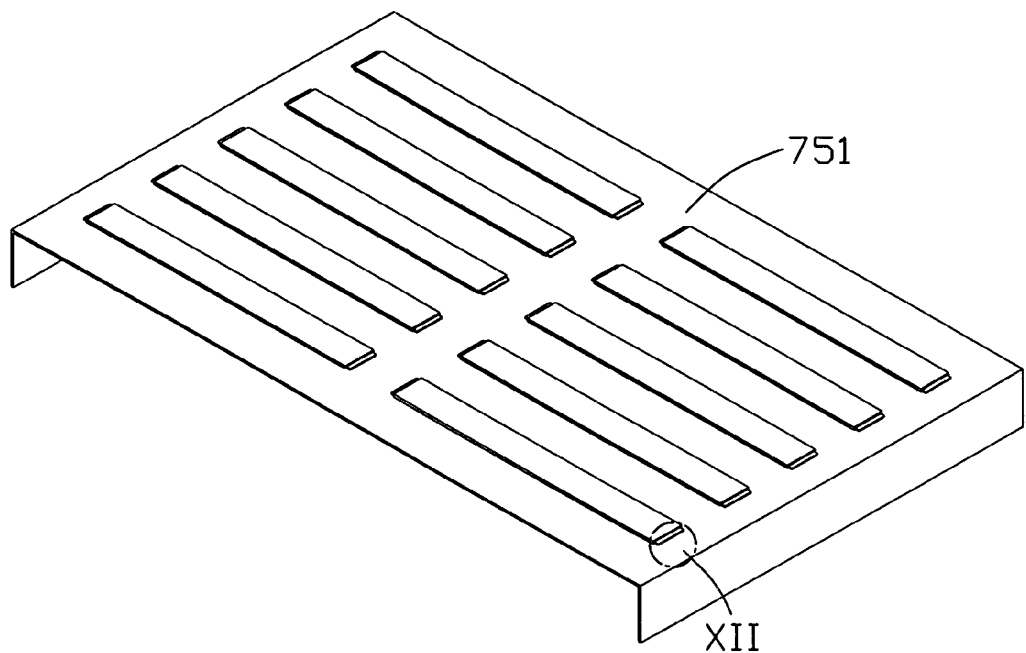
FIG. 11 is an inverted view of the backlight module of FIG. 10 when assembled.
Figure 12:
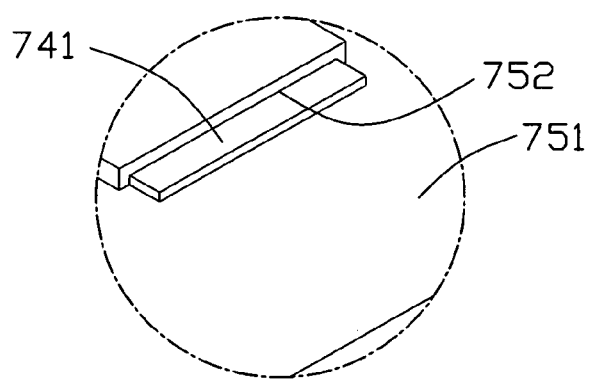
FIG. 12 is an enlarged view of a circled portion XII of FIG. 11.
Figure 13:
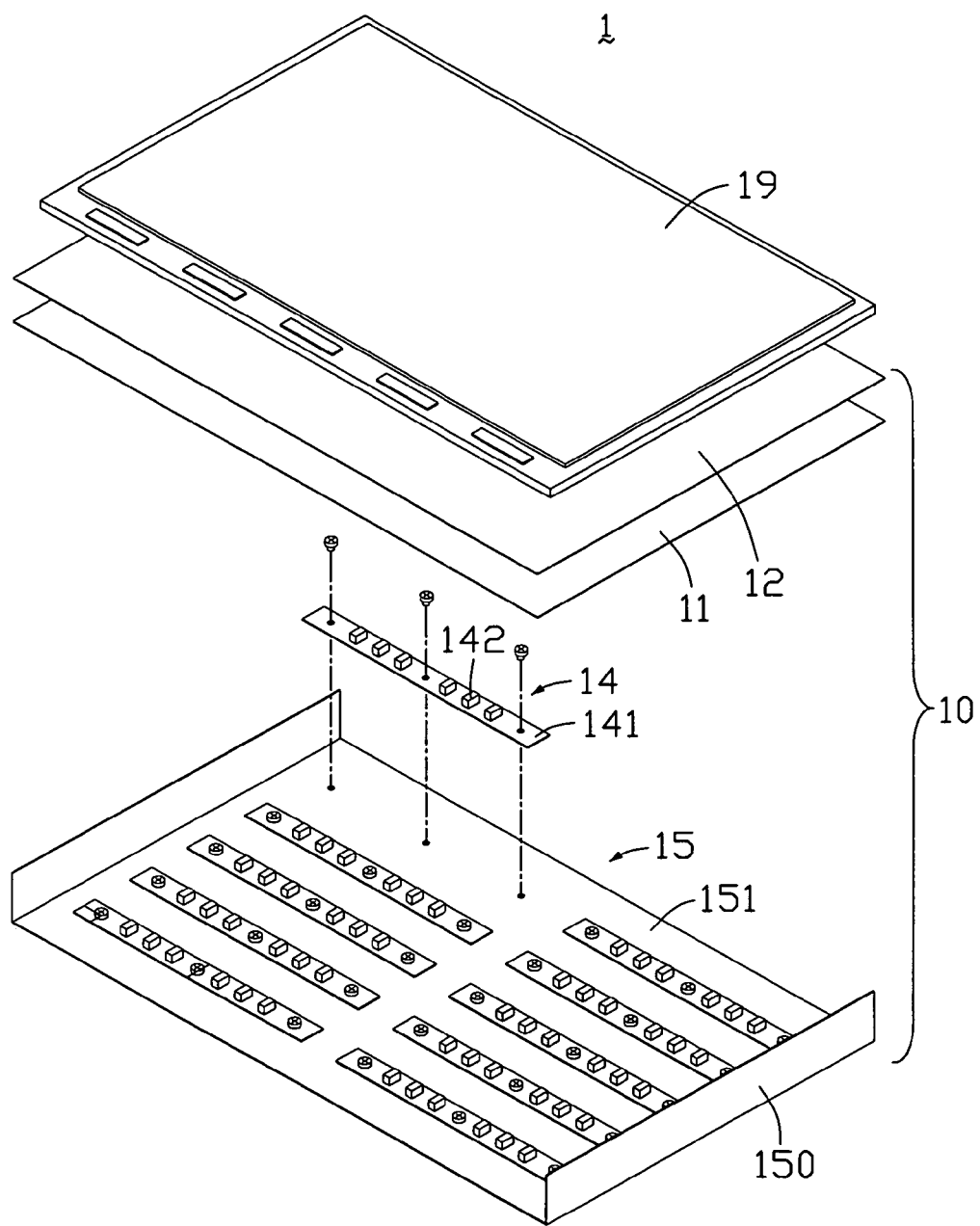
FIG. 13 is an exploded, isometric view of a conventional LCD device.

Referring to FIGS. 10-12, aspects of a backlight module 70 according to a sixth embodiment of the present invention are shown. The backlight module 70 is similar to the backlight module 20 in FIG. 1. However, a bottom plate 751 of a metal back frame 75 of the backlight module 70 includes a plurality of recesses 752. The recesses 752 are stripe shaped and can be formed by punching the bottom plate 751. The number of the recesses 752 matches the number of light sources 74 and the size and shape of each recess 752 match the corresponding light source 74. Each recess 752 includes four side walls (not labeled). Two through holes (not labeled) are disposed on the two side walls at opposite ends (not labeled) of the recess 752. A fixture block 753 is disposed at the center part of one of the two longer opposite side walls of the recess 752. An opening 743 corresponding to the fixture block 753 is disposed on a base 741 of the corresponding light source 74. The base 741 is longer than the recess 752.

The backlight module 70 is assembled by attaching the light sources 74 one by one. The base 741 of each light source 74 is slightly bent until the two ends of the base 741 are inserted into the two through holes disposed on the two side walls at the two opposite ends (not labeled) of the recess 752. Then the base 741 rebounds and abuts the bottom plate 751, with the fixture block 753 fitting into the opening 743 thereby fixing the base 741 on the bottom plate 751.

It is to be understood that even though numerous characteristics and advantages of the present embodiments have been set forth in the foregoing description with details of the structures and functions of the embodiments, the disclosure is illustrative only, and changes made in detail, especially in matters of shape, size, and arrangement of parts, within the principles of the invention, to the full extent indicated by the broad general meaning of the terms in which appended claims are expressed.

What is claimed is:

1. A backlight module, comprising:
a back frame comprising a bottom plate; and
a plurality of light sources each comprising a base and a plurality of light emitting elements disposed on the base;
wherein the bottom plate comprises a plurality of fixing structures respectively corresponding to the plurality of light sources to fix the plurality of light sources to the bottom plate, each fixing structure comprising a protuberant strip and two fixture portions at two ends of the protuberant strip, the protuberant strip comprising a bandy surface corresponding to the base of one of the plurality of light sources, each fixture portion comprising a groove, a distance between the two fixture portions being less than a length of the corresponding base when the base is unbent, and the base being bent to contact the bandy surface of the protuberant strip and have a shape defined by the protuberant strip with two ends of the base inserted into the grooves of the fixture portions.

2. The backlight module of claim 1, wherein the number and shape of the protuberant strips are the same as the bases of the light sources.

3. The backlight module of claim 1, wherein the plurality of fixing structures is arranged on the bottom plate in an array.

4. The backlight module of claim 3, wherein the back frame further comprises a plurality of side walls extending perpendicularly from edges of the bottom plate, the plurality of side walls and the bottom plate cooperatively defining an accommodating space.

5. The backlight module of claim 4, further comprising a diffuser and a brightness enhancement film, wherein the plurality of light sources, the diffuser, and the brightness enhancement film are accommodated in the accommodating space in that order from bottom to top.

6. A backlight module, comprising:
a back frame comprising a bottom plate; and
a plurality of light sources each comprising a flexible base and a plurality of light emitting elements disposed on the base;
wherein the bottom plate comprises a plurality of fixing structures respectively corresponding to the plurality of light sources to fix the plurality of light sources to the bottom plate, each fixing structure comprising two grooves defined in the bottom plate and a protuberant strip provided on the bottom plate between the two grooves, the protuberant strip comprising a bowed surface, a distance between the two grooves being less than a length of the base of the corresponding light source when the base is unbent, and two ends of the base inserted into the grooves such that the base is elastically bent and held in contact with the bowed surface of the protuberant strip with a shape defined by the bowed surface of the protuberant strip.

7. The backlight module of claim 6, wherein the number and shape of the protuberant strips are the same as the bases of the light sources.

8. The backlight module of claim 7, wherein the plurality of fixing structures is arranged on the bottom plate in an array.

9. The backlight module of claim 8, wherein the back frame further comprises a plurality of side walls extending perpendicularly from edges of the bottom plate, the plurality of side walls and the bottom plate cooperatively defining an accommodating space.

10. The backlight module of claim 9, further comprising a plurality of optical films, wherein the plurality of light sources and the plurality of optical films are accommodated in the accommodating space in that order from bottom to top.

11. A liquid crystal display device, comprising:
a display panel; and
a backlight module opposite to the display panel, the backlight module comprising:
a back frame comprising a bottom plate; and
a plurality of light sources each comprising a base and a plurality of light emitting elements disposed on the base;
wherein the bottom plate comprises a plurality of fixing structures respectively corresponding to the plurality of light sources to fix the plurality of light sources to the bottom plate, each fixing structure comprising two grooves defined in the bottom plate and a protuberant strip provided on the bottom plate between the two grooves, the protuberant strip comprising a bowed surface, a distance between the two grooves being less than a length of the base of the corresponding light source when the base is unbent, and two ends of the base inserted into the grooves such that the base is elastically bent and held in contact with the bowed surface of the protuberant strip with a shape defined by the bowed surface of the protuberant strip.

12. The liquid crystal display device of claim 11, wherein the number and shape of the protuberant strips are the same as the bases of the light sources.

13. The liquid crystal display device of claim 12, wherein the plurality of fixing structures is arranged on the bottom plate in an array.

14. The liquid crystal display device of claim 13, wherein the back frame further comprises a plurality of side walls extending perpendicularly from edges of the bottom plate, the plurality of side walls and the bottom plate cooperatively defining an accommodating space.

15. The liquid crystal display device of claim 14, further comprising a plurality of optical films, wherein the plurality of light sources and the plurality of optical films are accommodated in the accommodating space in that order from bottom to top.

* * * * *